Figure 1:
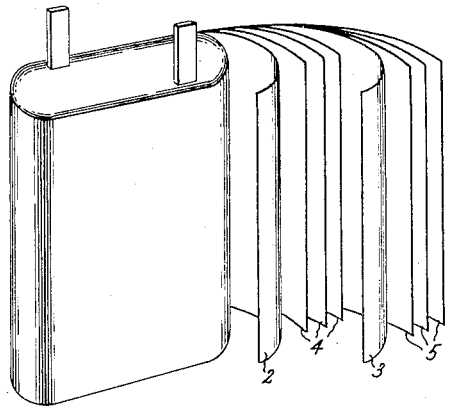

Sept. 19, 1944.   F. M. CLARK   2,358,627
DIELECTRIC COMPOSITION
Filed Feb. 12, 1944

Inventor:
Frank M. Clark,
by  Harry E. Dunham
His Attorney.

Patented Sept. 19, 1944

2,358,627

UNITED STATES PATENT OFFICE 2,358,627

DIELECTRIC COMPOSITION

Frank M. Clark, Pittsfield, Mass., assignor to General Electric Company, a corporation of New York Application February 12, 1944, Serial No. 522,114

11 Claims. (Cl. 252—66)

The present application is a continuation-in-part of application Serial No. 355,588, filed September 6, 1940, which in turn is a continuation-in-part of application Serial No. 322,599, filed March 6, 1940.

The invention herein described provides improved dielectric compositions suitable for use in electric capacitors, capacitance bushings, or other electric devices in which it is desired to employ dielectric materials characterized by high dielectric capacity, high resistivity and low power factor.

United States Letters Patent 2,041,594, patented May 19, 1936, describes electric capacitors containing halogenated polyphenyl dielectric materials, the preferred material being pentachlor diphenyl.

As a consequence of my present invention I have provided improved dielectric materials, the properties of which are more advantageous and when present in capacitors result in higher efficiencies than the materials of said prior patent.

The fact that the energy losses (power factor) in dielectric materials comprising or consisting of halogenated polyphenyl are remarkably low, renders such compounds particularly suitable for use in electric capacitors. Electric capacitors employed for power factor correction must be adapted for continuous operation without the overheating which would result from low power factor.

My present invention comprises compositions including as essential ingredients both halogenated polyphenyl and halogenated aromatic hydrocarbon containing a nitro group which are operable with unexpectedly high capacity ratings in capacitors with but little sacrifice of the advantageous power factor characteristic of the dielectric materials of prior Patent 2,041,594.

As stated in my prior application Serial No. 322,599, filed March 6, 1940, it has been found that chlorinated aromatic compounds containing in chemical combination a nitro group are characterized by remarkably high dielectric constants. Hence, such compositions when employed as capacitor impregnants result in efficiencies even superior to ordinary halogenated polyphenyl capacitor dielectric materials. Electric capacitors containing paper spacers and impregnated with tetrachlor orthonitro diphenyl unassociated with other dielectric materials are characterized by capacities which are 40 to 60 per cent higher than the capacities of similar capacitors impregnated with a conventional chlorinated diphenyl composition. The energy losses in such capacitors are somewhat greater than the conventional capacitors of the above-noted prior patent. Of course, this is not a desirable characteristic, particularly in devices intended for continuous operation in alternating current circuits.

I have discovered that mixtures or blends of chlorinated orthonitro diphenyl, or equivalent products, and conventional chlorinated diphenyl when employed as impregnants for capacitors are characterized by capacities which are higher and by power factors which are lower than predictable from the individual characteristics of such materials. Likewise, such blends or mixtures, examples of which will be hereinafter described, unexpectedly possess the additional advantage of being more stable in their capacity characteristics with rise of temperature.

Dielectric compositions may be prepared in accordance with my present invention which in capacitors result in a substantially constant capacity over a working range of temperatures, that is, within the limits of about 0° to 100° C. Electric capacitors containing chlorinated orthonitro diphenyl in amounts as small as one quarter of one per cent associated with conventional chlorinated polyphenyl compound are stable at elevated temperatures.

Figure 2:
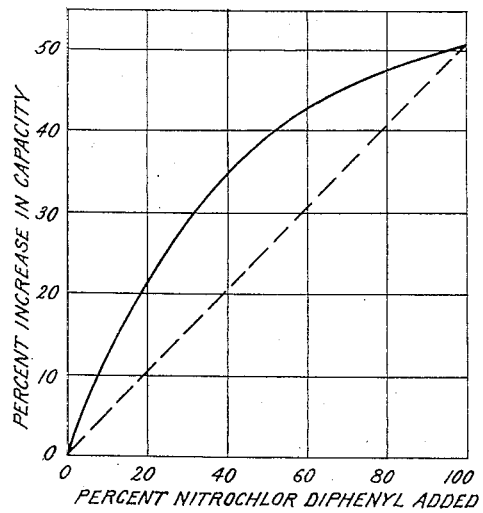

The accompanying drawing shows in Fig. 1 a paper-spaced capacitor; Fig. 2 is a graph of operating characteristics of capacitors containing compositions embodying my present invention.

Orthonitro diphenyl (unhalogenated) is a crystalline solid melting at about 37.5° C. It may be prepared by treatment of diphenyl with a nitration reagent, such as a mixture of nitric and sulphuric acid, at approximately 35 to 40° C. At 25° C. it has a dielectric constant of about 3.

The chlorination of orthonitro diphenyl may be carried out by well known methods utilizing catalyzer, such for example as iron or antimony or their chlorides. The time and temperature of chlorination will vary with the degree of chlorination desired and other conditions. For example, the following chlorination results were obtained with a catalyst of iron chloride ($FeCl_3$). Other halogens may be substituted for chlorine, as well understood.

The products herein described which are formed by the chlorination of orthonitro-diphenyl will be referred to as chlorinated orthonitro diphenyl to distinguish them from compositions made by the nitration of chlorinated diphenyl which are described in my prior Patent 2,019,337, patented October 29, 1935. When it is desired to indicate the amount of combined chlorine, the general term "chlorinated" will be replaced by more specific terms, such as monochlor or tetrachlor. Orthonitro diphenyl sometimes is referred to as mono-orthonitrodiphenyl.

*Table I*

| Temperature of chlorination centigrade | Per cent chlorine introduced | Preponderant isomers formed |
|---|---|---|
| 100 | 15 | Mono |
| 100 | 26 | Di |
| 100-125 | 34 | Tri |
| 100-130 | 41 | Tetra |
| 100-140 | 46 | Penta |
| 100-225 | 53 | Hexa |

The chlorinated products are purified by washing with an aqueous alkaline solution and by distillation, as well understood. For example, the chlorinated mixture is washed with water to remove acid reactant and undesired reaction products, and then is filtered to remove catalyst. Thereupon, it is washed with a one to three per cent sodium hydroxide aqueous solution until neutral. The neutral product is repeatedly washed with water to remove all traces of alkali and then is carefully distilled. A distillation under reduced pressure is preferred to avoid thermal decomposition. A 20 millimeter pressure is convenient.

The following properties characterize the products listed in Table I:

*Table II*

| | Boiling range, °C. (20 mm.) | Density (temp. as given) | Color A. S. T. M.[1] | Pour point, °C. | Viscosity[2] | Condition at 25° C. |
|---|---|---|---|---|---|---|
| Mono | 200-217 | 1.305 (15°) | 2 | −4 | 33 | Yellow liquid. |
| Di | 220-233 | 1.400 (15°) | 2 | 7 | 44 | Yellow liquid and crystals. |
| Tri | 238-250 | 1.470 (25°) | 2½ | 18 | 51 | Yellow liquid. |
| Tetra | 250-260 | 1.490 (100°) | 2 | 31 | 73 | Yellow viscous liquid. |
| Penta | 260-270 | 1.555 (100°) | 1¾ | 48 | 112 | Yellow crystalline resin. |
| Hexa | 270-280 | 1.640 (100°) | 1½ | 55 | 725 | Semi-crystalline resin. |

[1] A. S. T. M. is an abbreviation meaning American Society for Testing Materials.
[2] Viscosity values are given Saybolt Universal units taken at a temperature of 100° C.

The resistivity of the new chlorination products is high in all cases. What is even more important, the dielectric constant is high in all cases. At 25° C. it is in the range of 15 to 20 for the ortho mono nitrodiphenyl which has been chlorinated to a degree not exceeding five chlorine atoms. In all instances a materially higher dielectric constant results than is characteristic of the corresponding unnitrated chlorination product.

For some purposes a material containing about 41 per cent of chlorine is preferred. This material consists largely of isomers of the tetrachlor orthonitro diphenyl although it may be associated with some compounds of lower and some compounds of higher chlorine content. Its electrical resistivity is high, at 25° C. being $16,600 \times 10^9$ ohms per centimeter cube. Its dielectric constant at 25° C. is 19.9.

The chlorinated orthonitro diphenyl composition containing about 34 per cent chlorine and consisting largely of the trichlor orthonitro diphenyl for some purposes has advantages over the tetrachlor product. The electrical resistivity of this composition at 25° C. is $922 \times 10^9$ ohms. The dielectric constant at 25° C. is 22, and at 50° C. is 19.9.

Capacitors such as shown in Fig. 1 comprise aluminum foil armatures 2, 3 separated by sets of paper spacers 4, 5. When impregnated with these various chlorinated products, they are characterized by high capacity. A comparison capacitor containing three sheets of .0004 inch kraft paper spacers impregnated with pentachlor diphenyl and of standard dimensions chosen for comparative purposes had a capacity at 25° C. of 3.00 microfarads, and at 75° C. of 2.83 microfarads, measurements being made at 440 volts alternating current.

Similar standard units, when impregnated with the above-described chlorinated nitro products, have higher capacities, the increase in capacity ranging from about 40 to 60 per cent.

However, the power factor characteristics are less favorable. A standard pentachlor diphenyl capacitor is characterized at 25° C. by a power factor of .30, and at 75° C. by a power factor of .31. A similar standard capacitor impregnated with tetrachlor orthonitro diphenyl is characterized at 25° C. by a power factor of .50 and at 75° C. by a power factor of .86. When, however, mixtures of both classes of compounds are employed, then, as will be shown, results far better than expected results are obtained.

A dielectric impregnant consisting of a mixture containing by weight 25 per cent of this chlorinated nitro diphenyl composition and 75 per cent of pentachlor diphenyl at 25° C. has a power factor of .39 per cent, and at 75° C. a power factor of .48 per cent. At 100° C. the power factor of this blend falls to .44 per cent. The capacity increase obtainable with such mixture over the conventional capacitor impregnated with pentachlor diphenyl is 26 per cent. The electric capacity remains substantially constant over the range of temperatures from about 0° C. to about 100° C., and whatever small decreases of capacity may occur are in inverse ratio to the content of the chlorinated orthonitro diphenyl component.

As will be observed from the graph of Fig. 2, the capacities of mixtures of the conventional pentachlor diphenyl and tetrachlor orthonitro diphenyl over the entire range of compositions are higher than the values calculable from the known characteristics of such materials used by themselves. In Fig. 2 is shown a graph of such comparative values taken at 25° C. In this graph the ordinates are plotted in per cent increases of capacity in the treated capacitor and the abscissae are plotted in percentages of chlorinated nitro composition which is present in the mixture. For example, with an impregnating composition containing about equal parts of pentachlor diphenyl and tetrachlor orthonitro diphenyl, the increase of capacity to be obtained with the finished capacitor may be expected to be 25 per cent over that value of capacity characteristic of the capacitor treated with pentachlor diphenyl. Unexpectedly, an increase of 40 per cent is obtained. An impregnating mixture, containing by weight 75 parts of conventional chlorinated diphenyl and 25 parts of nitrochlor diphenyl, endows a treated capacitor with 93 per cent greater increase in electric capacity than would be anticipated from the known properties of the treating materials used in the blend. At higher operating temperatures similar unexpected improvements are obtained.

The power factors of dielectric compositions made in accordance with my invention are unexpectedly favorable.

In the following table are compared the power factor values of various blends with the power factor resulting when tetrachlor orthonitro diphenyl alone is used as an impregnant, the pentachlor diphenyl being indicated as A and the tetrachlor orthonitro diphenyl being indicated as B:

*Table III*

| Composition | Per cent power factor | |
|---|---|---|
| | 25° C. | 75° C. |
| Tetrachlor orthonitro diphenyl | .50 | .86 |
| 75A+25B | .39 | .48 |
| 50A+50B | .42 | .53 |
| 25A+75B | .39 | .75 |

Although the pour points and the viscosities of liquid compositions comprising mixtures of these two ingredients are higher than the pour point and viscosities of the pentachlor diphenyl ingredient alone, the low temperature characteristics and loss of capacity at low temperature is not unfavorably influenced by the presence of the compound containing the nitro group. The reduction in capacity which occurs in capacitors impregnated with chlorinated diphenyl compositions at temperatures of about +5° C. to —5° C. also occurs in capacitors impregnated with compositions of my present invention in substantially the same temperature range instead of occurring at a higher range as might be expected.

The operation of capacitors containing compositions embodying the present invention exhibits still another advantage, namely, effective stabilization against the deterioration which would otherwise occur at high temperatures.

Capacitors containing chlorinated diphenyl and constructed as described in prior Patent 2,041,594 are long-lived under operating conditions which limit their temperature to about 75 or 80° C. Should, however, the operating temperature rise even to about 90° C., then the power factor rises and the useful length of life of the capacitors becomes reduced. For some industrial applications of capacitors, temperatures as high as 100 to 100° C. are encountered. These adverse high temperature conditions are particularly pronounced when such capacitors are subjected to unidirectional (D. C.) voltages.

When about one quarter to two per cent by weight of chlorinated orthonitro diphenyl is blended with a chlorinated diphenyl impregnant, then the length of operating lives of the capacitors at such high temperatures is materially lengthened. This result is obtained when the impregnant consists of chlorinated diphenyl associated with another ingredient, as for example trichlorbenzene.

On the whole, the most favorable characteristics of capacity power factor and life have been found to result when a halogenated diphenyl impregnant, such as pentachlor diphenyl, has mixed therewith about one per cent of tetrachlor orthonitro diphenyl. No definite lower limit can be set. Smaller amounts than one per cent are effective in stabilizing halogenated diphenyl impregnants at elevated temperatures. The presence of one quarter per cent by weight of tetrachlor orthonitro diphenyl in capacitors operated at about 110° C. and being impregnated with pentachlor diphenyl increased the life about fourfold.

Additions greater than one or two per cent of chlorinated orthonitro diphenyl result in stabilization at high temperature but, as appears elsewhere herein, an accompanying increase of power factor occurs. Additions of chlorinated nitro diphenyl to conventional chlorination diphenyl of the order of one per cent produce little change in power factor.

While I have illustrated my invention with particular reference to compositions comprising pentachlor diphenyl and tetrachlor ortho nitrodiphenyl, I wish it to be understood that similar results are obtainable with other halogen derivatives of diphenyl, including chlorine derivatives of a lesser or greater number of chlorine atoms per molecule. Likewise, other halogen derivatives of orthonitro diphenyl may be used, including chlorine derivatives of a lesser or greater number of chlorine atoms per molecule.

For example, a liquid composition consisting by weight of 75 parts of trichlor diphenyl and 25 parts of tetrachlor ortho nitro diphenyl has a pour point of —14° C. and has unexpectedly favorable dielectric properties as hereinafter illustrated. An equal parts by weight mixture of these ingredients has a pour point of 0° C. and unexpectedly high dielectric properties. Various substitution and derivation products of said diphenyl compounds are to be considered as equivalents. For example, in place of halogenated diphenyl, halogen derivatives of diphenyl oxide, diphenyl methane, diphenyl ethane and diphenyl ketone may be employed. In place of halogenated orthonitro diphenyl various other chlorinated aromatic hydrocarbons containing a nitro group may be employed as, for example, chlorinated mononitro diphenyl methane and chlorinated alpha nitro naphthalene. Various degrees of chlorination of these compounds may be employed.

The following example illustrates my invention as embodied in a composition of trichlor diphenyl and tetrachlor orthonitro diphenyl.

Capacitors containing three sheets of .4 mil kraft paper vacuum dried at 100° C. when impregnated with mixtures of trichlor diphenyl and tetrachlor orthonitro diphenyl showed unexpectedly favorable characteristics. For example, capacitors similar to the above-described comparison unit when impregnated with trichlor diphenyl have a capacity at 25° C., 366 volts per mil test, of 3.20 microfarads. From the data already presented for the orthonitro tetrachlor diphenyl treated capacitors, capacitors treated with a blend containing equal parts by weight of the trichlor diphenyl and orthonitro tetrachlor diphenyl would be expected to have a dielectric capacity of 3.80 microfarads. Actual test of such capacitors, however, yields a capacity equal to 4.12 microfarads. Stated otherwise, there is obtained in this instance a capacity increase which is 53 per cent greater than that which would normally be expected from consideration of the known capacities of similar capacitors treated separately with trichlor diphenyl and orthonitro tetrachlor diphenyl. This unexpected capacity increase is not accompanied by an abnormal power factor. Capacitors treated with the mixture described have a 60 cycle power factor equal to .50 to .54 per cent at 25° C.

Blends of trichlor diphenyl and chlorinated orthonitro diphenyl in other proportions than described in the foregoing paragraph are of equal utility. For example, with a capacitor-treating blend containing only 25 per cent of the tetrachlor orthonitro diphenyl compound and 75 per cent of the trichlor diphenyl, capacitors of like construction to those of the foregoing paragraph gave a capacity of 3.66 microfarads and a power factor of .53 per cent. This is equal to a capacity increase equal to 53 per cent more than that which would be expected from the known values of capacitors treated with the single constituents of the mixture.

The following mixtures constitute additional examples of the wide scope of my invention. In the following table pentachlor diphenyl is designated as A and trichlor orthonitro diphenyl is indicated as C:

*Table IV*

|  | Specific gravity at 100° C. | Viscosity at 100° C. in seconds Saybolt | Pour point, deg. C. |
|---|---|---|---|
| 100% C (trichlor orthonitro diphenyl) | 1.410 | 51 | 17 |
| 75A+25C | 1.455 | 48 | 14 |
| 50A+50C | 1.435 | 49 | 16 |
| 25A+75C | 1.425 | 50 | 16 |

Capacitors containins three sheets of .4 mil kraft paper, vacuum dried at 100° C., when impregnated with the mixtures above listed had the following capacities in microfarads when tested at 440 volts (equal to 366 volts per mil):

*Table V*

|  | 100° C. | 75° C. | 50° C. | 25° C. |
|---|---|---|---|---|
| 100% A | 2.81 | 2.89 | 2.98 | 3.00 |
| 75A+25C | 3.49 | 3.59 | 3.71 | 3.80 |
| 50A+50C | 3.96 | 4.03 | 4.12 | 4.19 |
| 25A+75C | 4.25 | 4.41 | 4.46 | 4.51 |

The unexpectedly high capacity values of the capacitors treated with the impregnating blends described are clearly indicated. Capacity values for the capacitors treated with the blends are in some instances even higher than those capacities obtained when similar capacities are treated with the single components used in the blended compositions.

The following table shows the per cent power factors of such capacitors at 25° C.:

*Table VI*

```
                                    Power factor, per cent
100% C (trichlor orthonitro diphenyl)_____  .44
75A+25C _____  .35
50A+50C _____  .44
25A+75C _____  .42
```

Similar results are obtained with mixtures of penta chlorinated diphenyl and trichlor alpha nitronaphthalene.

In my copending application Serial No. 511,440, filed November 23, 1943, claims have been made on dielectric material comprising chlorinated diphenyl and chlorinated alpha nitronaphthalene.

In many capacitor installations it is desirable and necessary that the capacity of the capacitors should be closely maintained within the usual range of operating temperature. The addition of chlorinated orthonitro diphenyl to conventional halogenated polyphenyl dielectric materials provides a means of controlling the effect of temperature change on the electrical capacity value of capacitors treated with such compositions.

What I claim as new and desire to secure by Letters Patent of the United States is:

1. A dielectric material comprising as essential ingredients substantial proportions of tetrachlor orthonitro diphenyl derived by the chlorination of mono orthonitro diphenyl and pentachlor diphenyl.

2. A dielectric material suitable for use in electric capacitors comprising by weight about 25 to 75 parts of tetrachlor orthonitro diphenyl derived by the chlorination of mono orthonitro diphenyl and about 75 to 25 parts of pentachlor diphenyl.

3. A liquid composition which is suitable for the impregnation of electric capacitors comprising by weight about 25 to 75 parts of chlorinated orthonitro diphenyl derived by the chlorination of mono orthonitro diphenyl and about 75 to 25 parts of chlorinated diphenyl.

4. A liquid composition of matter suitable for capacitor impregnation, consisting essentially of about 25 per cent of orthonitro tetrachlor diphenyl derived by the chlorination of mono orthonitro diphenyl and about 75 per cent of pentachlor diphenyl.

5. A liquid dielectric composition of matter comprising as essential and substantial ingredients chlorinated orthonitro diphenyl derived by the chlorination of mono orthonitro diphenyl and trichlor diphenyl.

6. A dielectric material comprising as essential and substantial ingredients chlorinated diphenyl and chlorinated mono-ortho-nitro diphenyl derived by the chlorination of mono-ortho-nitro diphenyl.

7. A dielectric composition consisting by weight of a major proportion of tetrachlor-ortho-nitro diphenyl derived by the chlorination of mono-ortho-nitro diphenyl and a minor proportion of chlorinated diphenyl.

8. A dielectric composition consisting by weight of a major proportion of chlorinated diphenyl and a minor proportion of chlorinated orthonitro diphenyl derived by the chlorination of mono orthonitro diphenyl.

9. A dielectric material comprising as essential ingredients chlorinated diphenyl and an effective amount less than two per cent by weight of chlorinated orthonitrodiphenyl.

10. A dielectric material consisting of chlorinated diphenyl and approximately one per cent by weight of chlorinated orthonitro diphenyl.

11. A dielectric material consisting of pentachlor diphenyl and an effective amount approximating one-fourth to one per cent of tetrachlor orthonitro diphenyl.

FRANK M. CLARK.